United States Patent [19]
Casey

[11] 3,742,645
[45] July 3, 1973

[54] TELEPHONE DOLL

[76] Inventor: William J. Casey, 153 Rensselaer Road, Essex Falls, N.J.

[22] Filed: July 2, 1971

[21] Appl. No.: 159,521

Related U.S. Application Data
[63] Continuation of Ser. No. 863,629, Oct. 3, 1969, abandoned.

[52] U.S. Cl. .................................. 46/242
[51] Int. Cl. ............................. A63h 33/26
[58] Field of Search .................. 46/242, 1 R

[56] References Cited
UNITED STATES PATENTS
2,213,901  9/1940  Crawford ....................... 46/234
2,496,666  2/1950  Heyman ......................... 274/9

Primary Examiner—Louis G. Mancene
Assistant Examiner—J. Q. Lever
Attorney—Nolte & Nolte

[57] ABSTRACT

A plurality of telephones are utilized, one of which is held in normal talking position by a doll and the other of which is held in normal talking position by a child who controls, by her telephone, the conversation forthcoming from the doll which is playable from a tape played by a tape recorder contained within the telephone set.

5 Claims, 7 Drawing Figures

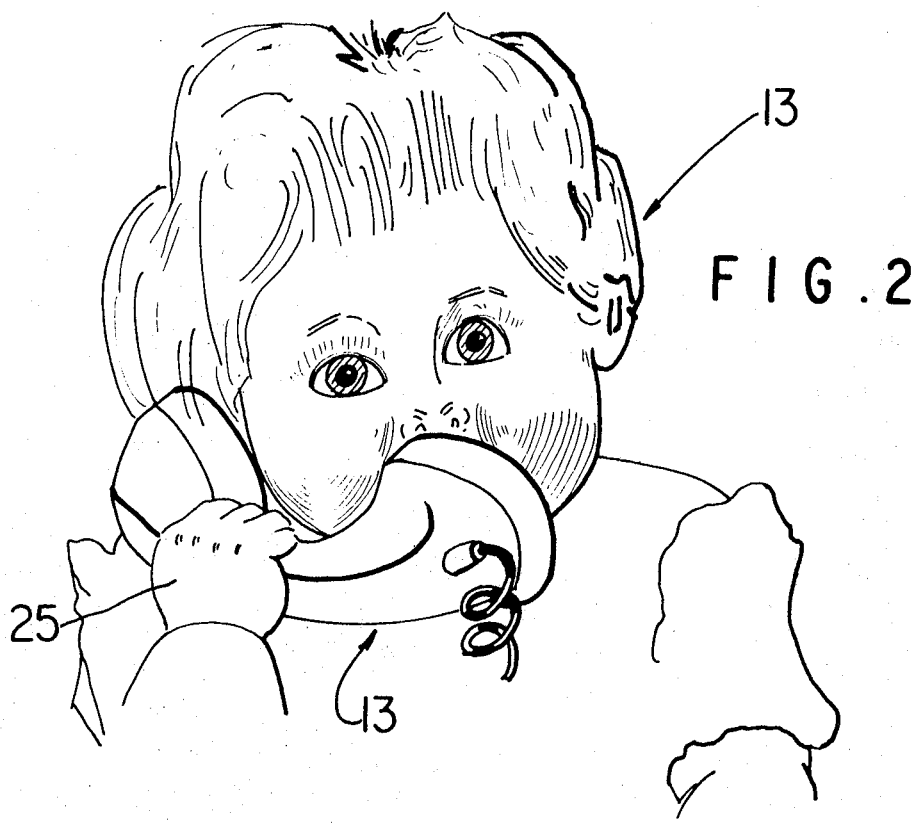
FIG. 2
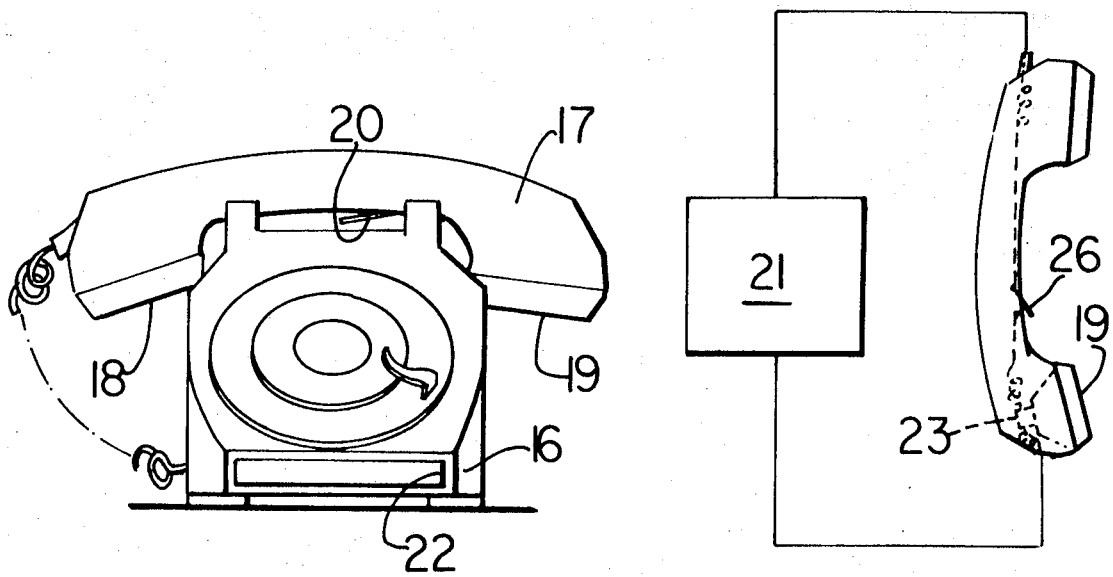
FIG. 3
FIG. 4
INVENTOR
WILLIAM J. CASEY
BY
Nolte and Nolte
ATTORNEYS

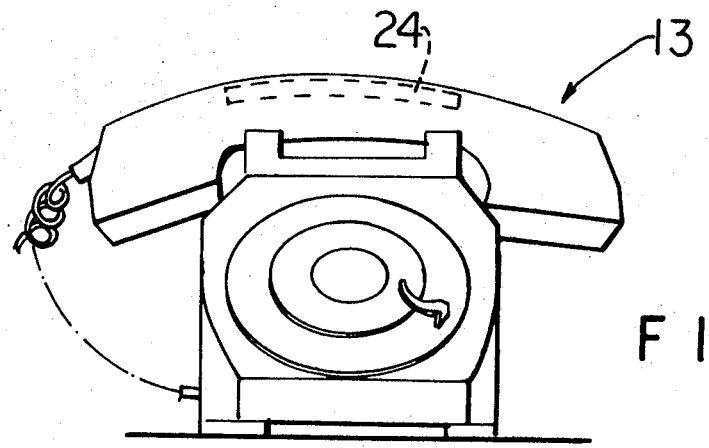
FIG. 5
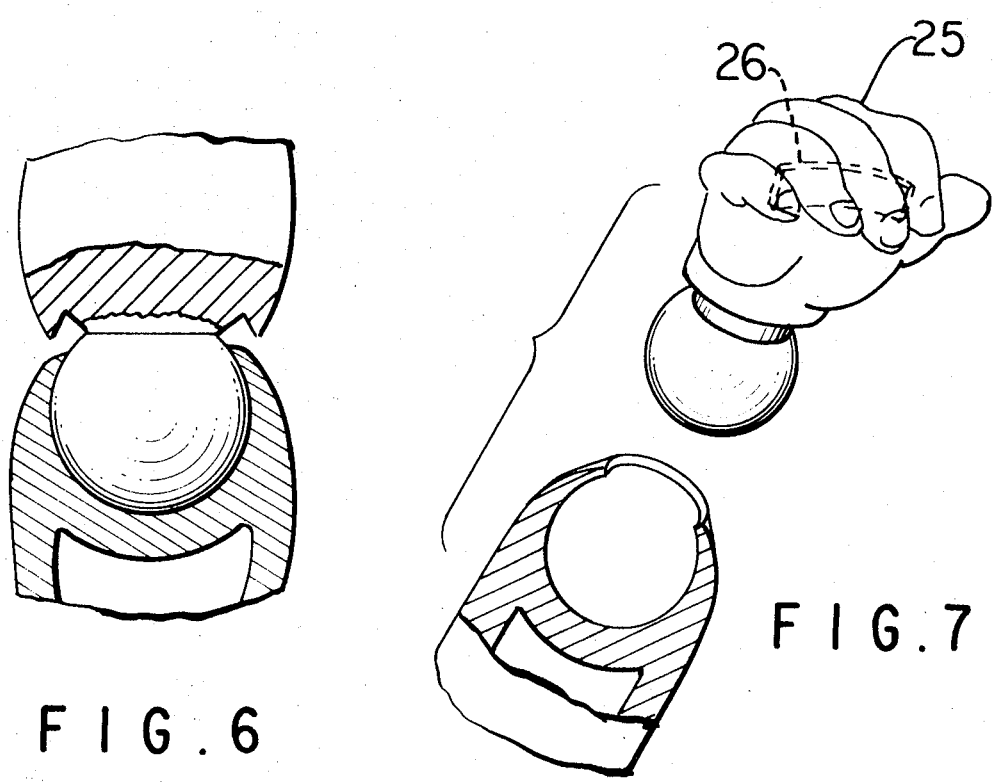
FIG. 6
FIG. 7

TELEPHONE DOLL

This application is a continuation of Ser. No. 863,629, now abandoned.

This invention relates to dolls and more particularly to dolls with whom a child may hold a telephone conversation.

Today, the importance of a child mastering the art of verbalization has been acutely appreciated. Children spend a great deal of time learning this art in the company of their dolls. In an attempt to aid this illusion of a real conversation existing between a child and her doll, dolls have been made to "talk" but this has not been achieved except in a very crude and elemental manner. One of the difficulties inherent in a talking doll is to achieve synchronization between the doll's mouth movement, if any, and the words being uttered. While children live in a world of illusion with their dolls, they nevertheless expect this illusion at least to approach reality.

By the provision of prerecorded tapes, this invention can be utilized by the parent as means for supplying educational information to the child in a most unusual and enjoyable way.

Accordingly, it is an object of the present invention to provide a doll which can participate in a natural conversation with a child and which conversation will be controlled by the child.

It is a further object of the present invention to provide such a talking doll wherein the doll can converse upon an infinite variety of topics and can do so in such a way that the conversation will be of educational value.

It is also an object of the present invention to provide a doll which will talk but whose mouth movements or lack thereof will not be noticed by a child.

It is a further object of the present invention to provide a means whereby a child can control the conversation transpiring between herself and here doll.

These and other advantageous features of the present invention will become apparent in conjunction with the specification and drawings wherein:

FIG. 2 is a view of the doll carrying on a telephone conversation taken from lines II—II of FIG. 1;

FIG. 3 is an elevational view of a telephone which is to be utilized by the child;

FIG. 4 is an electronic diagram of the mechanism of the present invention;

FIG. 5 is an elevational view of the doll's telephone according to the present invention;

FIG. 6 illustrates a conventional friction joint utilized to join a doll's lower and upper arms or the upper arms and shoulders.

FIG. 7 is an exploded perspective view of a hand and lower arm assembly of the prior art which can be utilized to effect mobility in a doll's hand.

Figure 1:
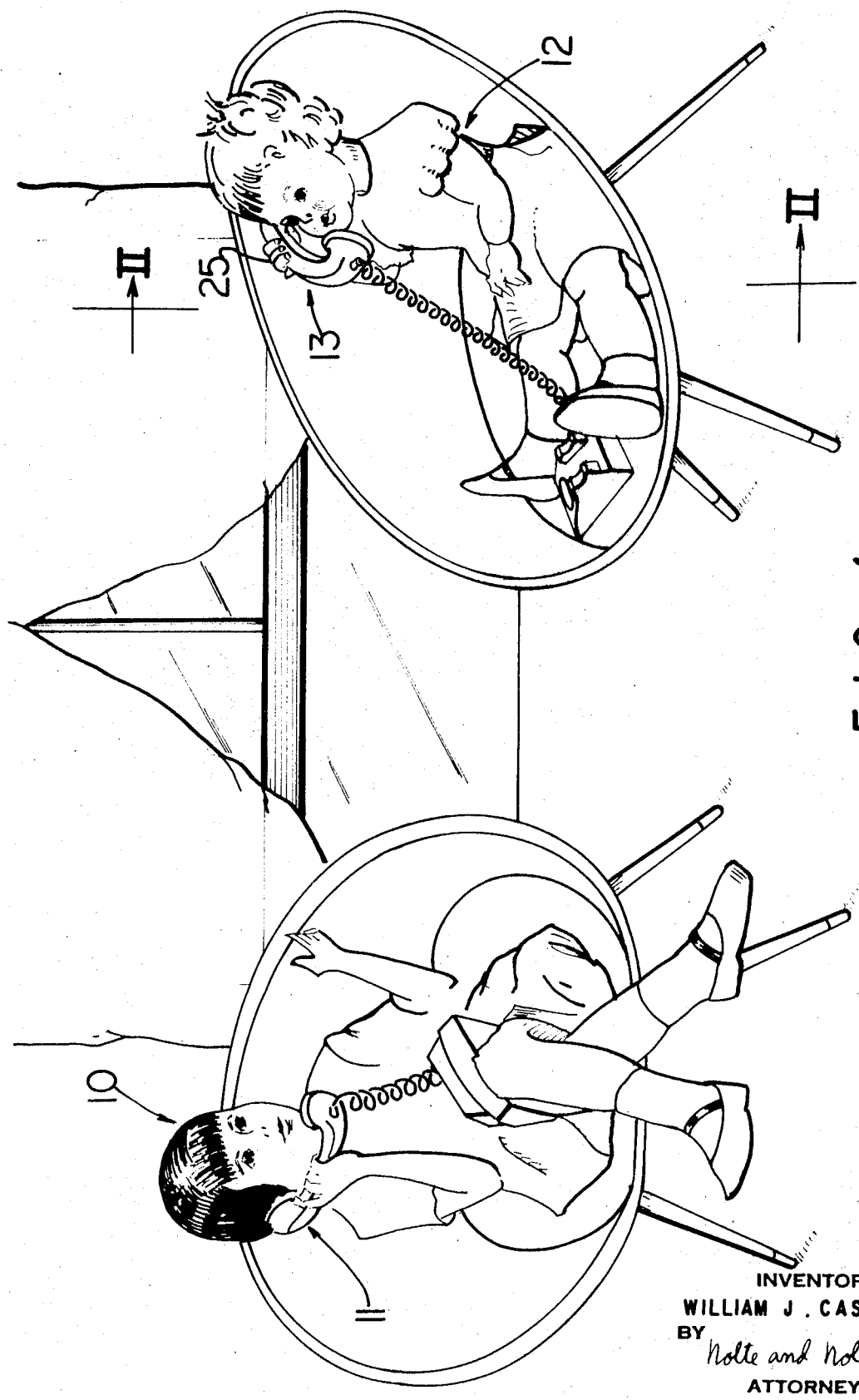
FIG. 1 is a perspective view of a child carrying on a telephone conversation with her doll.

FIG. 1 illustrates a child 10 talking on a telephone 11 to a doll 12 who is talking on her telephone 13.

To create a sense of reality in the conversation between a child and her doll, the doll's arm should be movable so that the phone can be maintained in a position as shown in FIG. 2. It can be appreciated that this positioning of the phone substantially covers the mouth of the doll and the doll can therefore speak without moving its mouth and without having this non-movement or non-synchronous movement detected by the child. This concealment by the phone thereby succeeds in creating reality of the illusion present in the situation.

FIG. 3 illustrates a phone having a base portion 16 and a transceiver portion 17 which contains a mouthpiece 18 and an earphone 19 and a displaceable button 20 which can be a conventional micro switch. The base portion 16 has a slot 22 formed therein as shown. Within the telephone base 16 a cassette tape player 21 is fixedly mounted in such a way that a pre-recorded cassette can be introduced thereinto by insertion through the slot. Entrance to the tape player can be defined by a movable bottom portion (not shown) whereby the necessary batteries can be inserted when necessary and the cassette player can be approached for repair or replacement.

As diagrammatically illustrated in FIG. 4, when the child pushes the button or switch 20 the cassette player circuit is closed and the tape is played. The earphone 19 which comprises the tape player speaker 23 transmits the sound originating from the prerecorded tape to the child's ear.

The doll's telephone is illustrated in FIG. 5. It is basically of conventional, light weight construction but in accordance with the teachings of the present invention a magnet 24 is situated in the telephone receiver for a purpose to be subsequently described.

FIGS. 6 and 7 illustrate conventional friction joints which may be utilized in conventional dolls so that the doll's arm and hand can be moved into such a position that the doll's hand holds the phone as shown in FIGS. 1 and 2. In the presently preferred embodiment, the doll's hand 25 contains a magnet 26 which acts in combination with the magnet within the receiver to maintain the doll's receiver in her hand.

While magnetic means are illustrated as the preferred means for maintaining the doll's receiver in her hand it is within the scope of the present invention to utilize adhesive means such as pressure sensitive tape or the like or to utilize a doll whose fingers are sufficiently mobile to hold the phone in the doll's hand without the need of adhesive or the like.

Additionally, while the cassette tape player actuating button 20 is, in accordance with FIG. 3, positioned on the telephone receiver which is to be held by the child, it can be equally desirable to make such a switch integral with the telephone base portion.

Furthermore, while in accordance with the presently preferred embodiment, the two telephones are not actually interconnected, such connection may be provided where it is desired to have the tape player in the doll's telephone.

By providing a plurality of dolls with telephones and a corresponding sequence of recorded messages on the tape, a child could "converse" with each of the dolls, in prearranged or random order.

What is claimed is:

1. The combination of a doll and first and second simulated telephones, each of said telephones including a telephone transceiver part and a telephone base part with a cradle for the transceiver part, said doll having an arm and associated hand and a head including a mouth, means on said transceiver part of said first telephone and on said hand removably securing the same together, said arm including means for positioning said associated hand and secured transceiver part with the transmitting portion thereof in front of said mouth, at least one of said telephone base parts including means for insertion and removal of a prerecorded tape, means for playing the tape the transceiver part of said second telephone including means for transmitting sound from said playing means, switch means mounted on said transceiver part of said second telephone, and circuit means for connecting said switch means said sound transmitting means and said playing means, said combination constituting means for transmitting oral intelligence on demand in a simulated telephonic conversation with said doll.

2. The combination of claim 1 wherein said receiving means are magnetic means in both said transceiver part and said hand.

3. The combination of claim 2 wherein said magnetic means comprises bar-shaped magnets, one of which is secured in the palm of one of the doll's hands.

4. The combination of claim 1 wherein said arm includes an upper and lower portion and said positioning means comprises ball and socket means between the hand and the lower arm and between the lower arm and the upper arm for moving the arm and hand.

5. The combination of claim 1 wherein said insertion means comprises a slot in said base.

* * * * *